Figure 1:
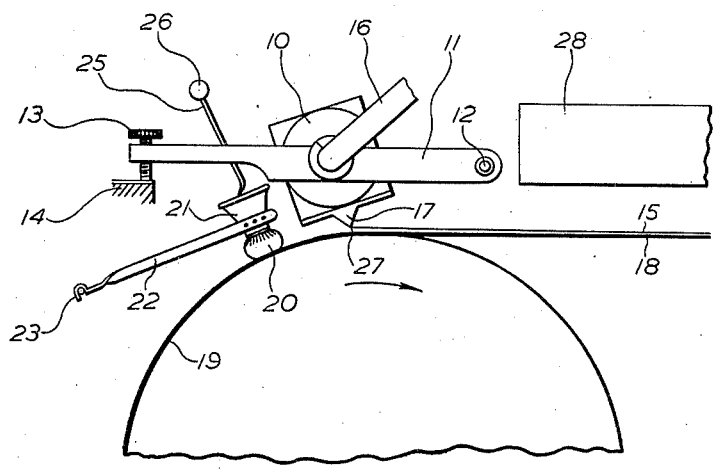

Aug. 1, 1939. J. H. ROONEY ET AL 2,167,909

MANUFACTURE OF MATERIALS HAVING AN ORGANIC BASIS

Filed Sept. 25, 1936

INVENTORS
James Henry Rooney
Philip Richard Hawtin
BY
ATTORNEYS

Patented Aug. 1, 1939

2,167,909

UNITED STATES PATENT OFFICE 2,167,909

MANUFACTURE OF MATERIALS HAVING AN ORGANIC BASIS

James Henry Rooney and Philip Richard Hawtin, Spondon, near Derby, England, assignors to Celanese Corporation of America, a corporation of Delaware Application September 25, 1936, Serial No. 102,490
In Great Britain October 3, 1935

7 Claims. (Cl. 18—57)

This invention relates to the manufacture of films, foils, ribbons and like products, by processes wherein a shaped composition containing volatile solvent is drawn into contact with and supported on a surface which is travelling in a gaseous medium.

An important process of this kind is that in which a composition containing cellulose acetate, nitrocellulose or other suitable foil-forming base in solution in a volatile solvent is extruded on to a travelling belt or revolving drum on which setting of the shaped composition to form the foil takes place owing to evaporation of the solvent, which is assisted by heating the drum or belt and/or the surrounding atmosphere.

We have found that in such processes, and particularly when the supporting surface for the foil travels at relatively high speeds, for example at 25 to 30 feet per minute or more, air tends to be drawn into the angle between the shaped composition and the supporting surface. As a result bubbles of air form between the foil and the supporting surface causing defects in the foil and even in some cases rupture at the point where it leaves the supporting surface. The object of the present invention is to obviate this defect.

The tendency to draw air under the foil may be reduced somewhat by increasing the angle which the composition makes with the supporting surface. The extent, however, to which this angle can be varied is limited. Reduction of the draw-down of the nascent foil, that is the stretch effected owing to the difference in speed between the travelling surface and the speed of extrusion of the composition, also tends to reduce the formation of air-bubbles. Reduction of the draw-down, however, beyond a certain limit detracts from the quality of the foil. Trials were also made using a suction device to remove air from the angle between the shaped composition and the supporting surface, but this method was found to have several disadvantages. For example, it may result in premature setting of the composition and also the suction may deflect the nascent foil from its path.

According to the present invention in the manufacture of films, foils, ribbons and like products by methods, particularly evaporative methods, in which a shaped film-forming composition is drawn into contact with and supported on a surface which is travelling in a gaseous medium, a pocket of liquid, preferably an oily liquid compatible with the base of the products, is maintained in the angle between the shaped composition and the supporting surface.

We have found that by this means the entry of air between the shaped composition and the supporting surface can be prevented, and the supporting surface can be caused to travel at much higher speeds than would otherwise be practicable. The liquid is preferably applied to the supporting surface at a point in its travel immediately before it is met by the shaped film-forming composition. A very convenient method of applying the liquid is by means of a pad of absorbent material kept in light contact with the supporting surface and continuously supplied with the liquid. The invention includes film-forming apparatus provided with means for maintaining such a pocket of liquid. The invention is of particular importance in connection with the manufacture of films, foils, ribbons and like products by the evaporative method from cellulose acetate.

The liquid used should be compatible with the base of the products, i. e. capable of swelling the base or of forming solutions or solid solutions therewith, of sufficiently low surface tension to spread over the supporting surface and not so volatile as to undergo excessive evaporation between the point of application and the point at which the film-forming composition meets the surface. Liquids of high solvent power for the base are preferably employed in admixture with solid or liquid substances of lower solvent power such, for example, as plasticizers for the base.

Among solvents for cellulose acetate are acetone, methyl ethyl ketone, cyclohexanone, diacetone alcohol, benzyl alcohol, cyclohexanol, the monomethyl and dimethyl ethers of ethylene glycol, the monoacetates of ethylene glycol and its monomethyl or monoethyl ethers, dioxane, dimethyl dioxane, formal, acetal and other condensation products of formaldehyde, acetaldehyde or benzaldehyde with glycols or polyhydric alcohols, particularly cyclic condensation products such as methylene ethylene ether, esters such as methyl acetate and ethyl lactate, and chlorinated hydrocarbons such as tetrachlorethane.

The class of liquid plasticizers includes dimethyl, diethyl, dibutyl and diamyl phthalates, triacetin, tributyl phosphate and tricresyl phosphate.

All these plasticizers are compatible with cellulose acetate; that is they are capable of entering into solid solution therewith. They are to be distinguished from softening agents such as castor oil and similar vegetable oils, which are sometimes incorrectly termed plasticizers although they do not form solid solutions even with nitrocellulose and cannot be successfully introduced into cellulose acetate at all.

Examples of liquids which are swelling agents for cellulose acetate without being true solvents include methyl and ethyl alcohol, methylene chloride and other alcohols and chlorinated hydrocarbons. These solvents, swelling agents and plasticizers can be used with derivatives of cellulose other than cellulose acetate particularly nitrocellulose.

Particularly good results are obtainable by using as the air-excluding liquid a solution of a liquid plasticiser in a volatile liquid identical with the solvent of the foil-forming composition, or where a solvent mixture is used, with the major constituent thereof. The plasticiser also may with advantage be the same as that contained in the foil-forming composition. Thus, for example, in the formation of foils from compositions containing cellulose acetate and dibutyl phthalate in solution in acetone, it is of particular advantage to use as the air excluding liquid, a solution of dibutyl phthalate in acetone. The proportions may be varied over a considerable range, for example, the plasticiser may constitute from 25–75% of the mixture.

In such mixtures the acetone or other volatile solvent serves the useful purpose of assisting the even distribution of the plasticiser over the supporting surface. The conditions may be such that the bulk of the volatile solvent has evaporated by the time the part of the surface to which the liquid was applied has moved into contact with the foil.

Liquids which are incompatible with the foil-forming base, e. g. in the case of cellulose acetate, hydrocarbons and animal and vegetable oils, if employed as constituents of the air-excluding liquid at all should only be present in admixture with relatively large proportions of liquids which are solvents for the cellulose acetate, or are at least compatible therewith.

The liquid may, if desired, contain colouring agents for the foil, or may form a vehicle for the introduction of other desired agents, for example effect materials, into the foil. The liquid may also contain solid plasticisers for the cellulose derivative, e. g. triphenyl phosphate, benzyl benzoate, ethyl acetanilide, acetophenone, and glyceryl tribenzoate.

The liquid may be applied in any suitable way. It may, for example, be sprayed on to the supporting surface at or immediately before the two meet. It may be applied to the supporting surface by means of brushes, pads, or suitably surfaced rollers. Thus, for example, a pad bearing on the surface at a suitable position in advance of the extrusion orifice may be supplied with the liquid by capillary action, by a drip feed, or by pressure feed from a pump. Thus the liquid may be supplied by means of a pump to a slotted tube fixed transversely relative to the supporting surface and having the slot closed by a pad bearing against that surface. The pump may be driven from the main drive of the machine thus ensuring a regular feed of liquid proportional to the speed. The means adopted whatever its nature should be capable of supplying the liquid in sufficient quantity to form the desired seal at the nip between the supporting surface and the foil while avoiding such excess as would interfere with the properties of the foil. It is also of advantage that the amount supplied in unit time should be constant. When the liquid includes a volatile constituent the applying means may with advantage be of an enclosed type such as the pad and pump arrangement described above, with a view to limiting evaporative losses.

Figure 2:
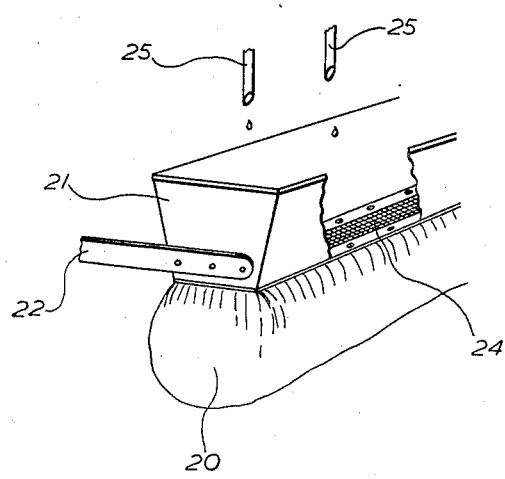

The invention is illustrated in the accompanying drawing wherein:

Fig. 1 represents a side elevation of one end of the film-forming apparatus, and Fig. 2 a detailed view of the liquid-furnishing means.

10 represents a film-forming box supported on an arm 11 pivotally mounted at 12 and adjustable in the vertical plane by means of the screw 13 resting on the support 14. A film-forming composition 15 comprising a solution of cellulose acetate in acetone is supplied to the casting box through the dope pipe 16 and extruded through the die 17 in the form of a film 15 on to an endless metallic band 18 driven in the direction shown by the arrow by means of the drum 19. A pad of soft leather 20 filled with gamgee or like absorbent material is attached to the open bottom of a trough 21 supported on the arm 22 which is pivotally mounted at 23 so that the pad rests lightly on the metallic band 18. A gauze filter 24 is provided between the open bottom of the trough and the interior of the pad. A 25–75% solution of diethyl phthalate in acetone is supplied by the header 26 to the drip-pipes 25 whence it drips on to the gauze filter 24 and finds its way through the interior of the pad 20 on to the band 18. The rate at which this liquid is supplied is adjusted so that the liquid is continuously carried by the movement of the band 18 into the angle 27 between the band and the film-forming composition 15, and maintains a pocket of liquid in that angle. The film forming composition is carried by the band beneath a heating device 28 and is progressively converted into a film during its passage towards the other end of the machine (not shown), whence it is removed in the form of a substantially dry film. During this passage the diethyl phthalate is absorbed into the film and the bulk of the acetone is evaporated.

By the process of the invention, it is possible to carry out the formation of cellulose derivative foils at high speeds, for example 50–100 ft. per minute without any bubble formation. Moreover, as indicated above, the process of the invention provides a convenient means of introducing additional agents into the foils without adversely effecting their finish or quality.

The invention has been described with particular reference to the manufacture of foils having a basis of cellulose acetate or nitrocellulose. It is, however, applicable in other processes wherein an incompletely set film, foil, ribbon or the like is brought into contact with and supported by a travelling surface, for example in the manufacture of foils from other organic derivatives of cellulose, such for instance, as cellulose formate, propionate and butyrate, ethyl, methyl and benzyl cellulose, ethyl cellulose acetate and oxyethyl cellulose acetate, from polymerised unsaturated esters, such for instance as polymerised vinyl acetate; or from polymerised unsaturated hydrocarbons.

Having described our invention what we desire to secure by Letters Patent is:

1. In a process for the manufacture of films, foils, ribbons and like products by extruding a film-forming composition containing a volatile solvent into an evaporative atmosphere, wherein the film-forming composition shaped during the extrusion thereof is drawn into contact with and supported on a surface which is travelling in a gaseous medium, the steps of causing the supporting surface to travel at a speed of at least 25 feet per minute and maintaining a pocket of liquid in the angle between the shaped composition and the supporting surface so as to prevent the gaseous medium being drawn into said angle.

2. In a process for the manufacture of films, foils, ribbons and like products by extruding a film-forming composition containing a volatile solvent into an evaporative atmosphere, wherein the film-forming composition shaped during the extrusion thereof is drawn into contact with and supported on a revolving drum which is travelling in a gaseous medium, the steps of causing the drum to revolve at a speed of at least 25 feet per minute and maintaining a pocket of an oily liquid compatible with the base material of the products in the angle between the shaped composition and the surface of the drum by continuously supplying the oily liquid to said surface at a point in its travel just before it is met by the extruded composition so as to prevent the gaseous medium being drawn into said angle.

3. In a process for the manufacture of films, foils, ribbons and like products by extruding a film-forming composition containing a volatile solvent into an evaporative atmosphere, wherein the film-forming composition shaped during the extrusion thereof is drawn into contact with and supported on a travelling band which is travelling in a gaseous medium, the steps of causing the supporting band to travel at a speed of at least 25 feet per minute and maintaining a pocket of an oily liquid which is compatible with the base material of the products in the angle between the shaped composition and the surface of the band by continuously supplying the oily liquid to said surface at a point in its travel just before it is met by the extruded composition so as to prevent the gaseous medium being drawn into said angle.

4. Process for the manufacture of films, foils, ribbons and like products by extruding a film-forming composition comprising a solution of a cellulose derivative in a volatile solvent into an evaporative atmosphere, wherein the film-forming composition shaped during the extrusion thereof is drawn into contact with and supported on a travelling band which is travelling in a gaseous medium and forming the desired product by evaporation of the bulk of said solvent into said gaseous medium, said process comprising causing the band to travel at a speed of at least 25 feet per minute and maintaining a pocket of liquid, comprising a swelling agent for the cellulose derivative, in the angle between the shaped composition and the surface of the band by continuously supplying the swelling agent to said surface at a point in its travel just before it is met by the extruded composition so as to prevent the gaseous medium being drawn into said angle.

5. Process for the manufacture of films, foils, ribbons and like products by extruding a film-forming composition comprising a solution of cellulose acetate in a volatile solvent into an evaporative atmosphere, wherein a film-forming composition is drawn into contact with and supported on a travelling band which is travelling in a gaseous medium and forming the desired product by evaporation of the bulk of said solvent into said gaseous medium, said process comprising causing the band to travel at a speed of at least 25 feet per minute and maintaining a pocket of liquid, comprising a solution of plasticizer for the said cellulose acetate in a volatile solvent of the same nature as that forming the solvent of the film-forming composition, in the angle between the shaped composition and the surface of the band by continuously supplying the solution of plasticizer to said surface at a point in its travel just before it is met by the extruded composition so as to prevent the gaseous medium being drawn into said angle.

6. Process for the manufacture of films, foils, ribbons and like materials comprising extruding a film-forming solution of cellulose acetate in acetone on to a metallic band travelling at a speed of about 90 feet per minute or more, converting the extruded composition into the desired product during its travel on the band by evaporation of the bulk of the acetone and maintaining a pocket of liquid in the angle at which the composition meets the band by continuously applying to the band at an earlier point in its travel a 25–75% solution of a plasticiser for cellulose acetate in acetone.

7. Process according to claim 6, wherein the plasticiser is diethyl phthalate.

JAMES HENRY ROONEY.
PHILIP RICHARD HAWTIN.